United States Patent
Latimer et al.

(10) Patent No.: US 12,498,070 B2
(45) Date of Patent: Dec. 16, 2025

(54) MARINE BREAKAWAY COUPLINGS

(71) Applicant: Flexible Engineered Solutions Limited, Ashington (GB)

(72) Inventors: Ian Latimer, Stannington (GB); Michael Stanton, Backcrofts (GB)

(73) Assignee: Flexible Engineered Solutions Limited, Northumberland (GB)

( * ) Notice: Subject to any disclaimer, the term of this patent is extended or adjusted under 35 U.S.C. 154(b) by 255 days.

(21) Appl. No.: 18/024,589

(22) PCT Filed: Sep. 1, 2021

(86) PCT No.: PCT/GB2021/052253
§ 371 (c)(1),
(2) Date: Mar. 3, 2023

(87) PCT Pub. No.: WO2022/049371
PCT Pub. Date: Mar. 10, 2022

(65) Prior Publication Data
US 2023/0323993 A1    Oct. 12, 2023

(30) Foreign Application Priority Data
Sep. 4, 2020   (GB) .................................. 2013921

(51) Int. Cl.
*F16L 55/10*   (2006.01)
(52) U.S. Cl.
CPC ................. *F16L 55/1007* (2013.01)
(58) Field of Classification Search
CPC ...... F16L 55/1007; F16L 29/005; F16L 29/04
See application file for complete search history.

(56) References Cited

U.S. PATENT DOCUMENTS

| | | | |
|---|---|---|---|
| 4,326,555 A | 4/1982 | Thomson | |
| 11,332,070 B2* | 5/2022 | Holden | G06K 7/10366 |
| 2002/0169527 A1* | 11/2002 | Cline | G08G 3/00 701/21 |

(Continued)

FOREIGN PATENT DOCUMENTS

| | | |
|---|---|---|
| CN | 103732968 A | 4/2014 |
| CN | 107636376 A | 1/2018 |
| CN | 110132581 A | 8/2019 |

(Continued)

OTHER PUBLICATIONS

Chinese Patent Office, Search Report in Chinese Patent Application No. 2021800528345, mailed Jun. 11, 2025, 3 pp.

(Continued)

*Primary Examiner* — An T Nguyen
(74) *Attorney, Agent, or Firm* — Leydig, Voit & Mayer, Ltd.

(57) ABSTRACT

A breakaway coupling system for an offloading string comprises a first coupling part 101 and a second coupling part 102. The coupling parts are connectable together to form a conduit through which fluid can flow and separable from each other to seal the conduit. The system further comprises movement sensing means 160, 162, 166, 168 arranged to sense movement of the two coupling parts relative to each other and transmission means arranged to transmit a separation signal in response to sensing of the relative movement.

17 Claims, 6 Drawing Sheets

(56) References Cited

U.S. PATENT DOCUMENTS

2013/0025698 A1   1/2013   Safi-Samghabadi et al.
2016/0229680 A1   8/2016   Cornett et al.

FOREIGN PATENT DOCUMENTS

| GB | 2556791 A | | 6/2018 | |
|---|---|---|---|---|
| GB | 2560751 A | * | 9/2018 | ............ B63B 27/34 |
| WO | 2009/082241 A1 | | 7/2009 | |
| WO | 2022/049371 A1 | | 3/2022 | |

OTHER PUBLICATIONS

European Patent Office, International Search Report in International Patent Application No. PCT/GB2021/052253, mailed Nov. 29, 2021, 2 pp.
UK Intellectual Property Office, Search Report in British Patent Application No. GB2013921.8, mailed Feb. 25, 2021, 4 pp.
UK Intellectual Property Office, First Search Report in British Patent Application No. GB2112437.5, mailed Jan. 17, 2022, 4 pp.
UK Intellectual Property Office, Second Search Report in British Patent Application No. GB2112437.5, mailed May 16, 2022, 2 pp.

* cited by examiner

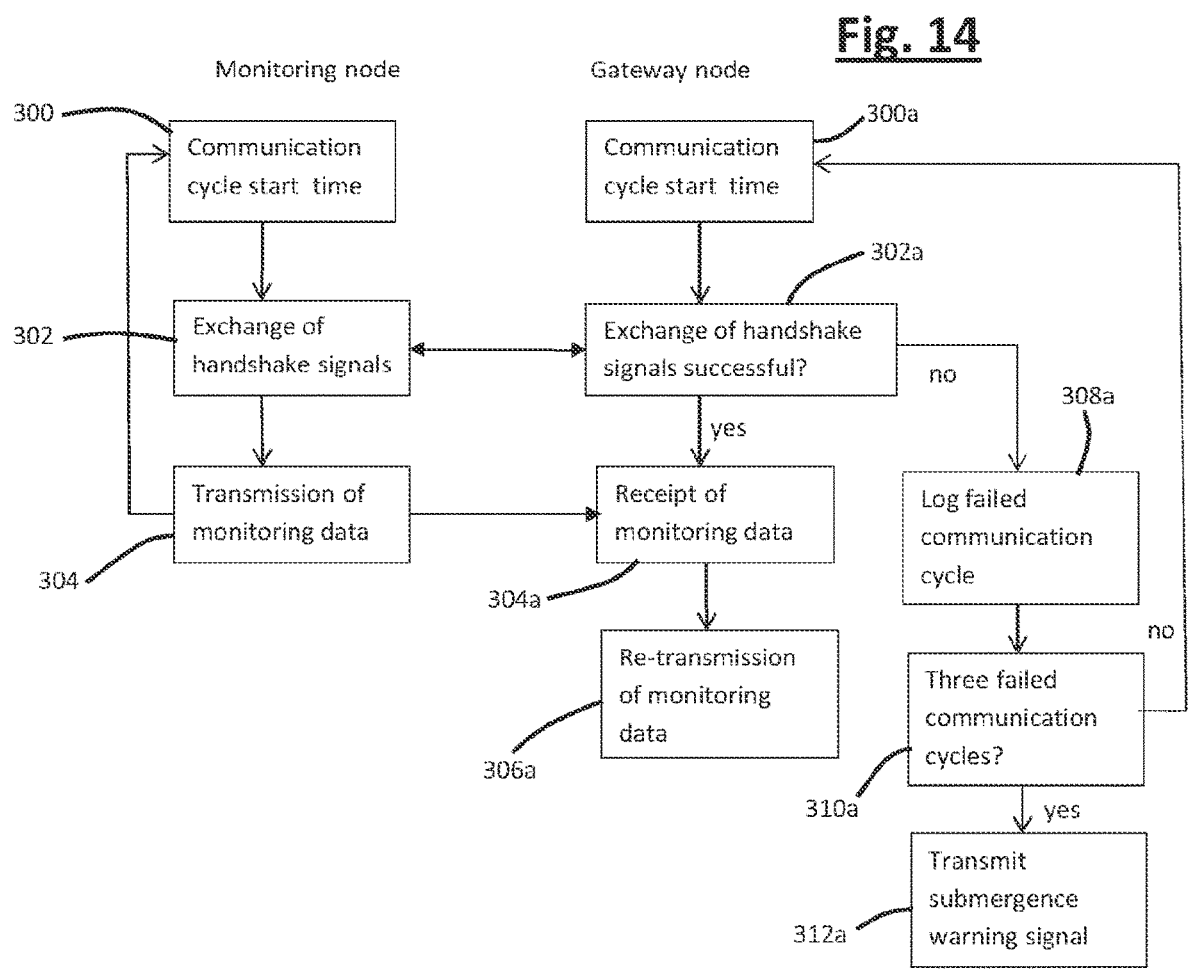

MARINE BREAKAWAY COUPLINGS

FIELD OF THE INVENTION

The present invention relates to Marine Breakaway Couplings (MBCs) and in particular to systems for monitoring the function and condition of such couplings.

BACKGROUND TO THE INVENTION

In the offshore oil and gas industry a flexible offloading string, which may be floating, submerged or in an aerial arrangement is used to transport products for example oil and gas in a range of systems, for example Catenary Anchor Leg Mooring (CALM), Single Anchor Leg Mooring (SALM), Multi Buoy Mooring (MBM), Tandem Mooring, Reeling, Chute, Catenary, jumper and tower systems. A flexible offloading string is typically made up of sections, which may be flexible for example rubber hoses joined together with flanges, and associated ancillary equipment.

As these systems are located in an offshore environment they are subject to extreme environmental conditions and from time to time accidents. In particular, the offloading string can be subject to extreme loads which can result in the failure of the entire string or individual sections making up the string. In case of a failure, depending on the offshore location of the system, it could be some time before the operational team can mobilise to manage the accident and contain any spillage of the product into the environment. To this extent the failure of an offloading string can have catastrophic impact on the environment and be extremely costly. Therefore, it is conventional to install an MBC within an offloading string. The MBC is then set so that it will separate to allow the string to break in a controlled manner when the stresses increase beyond a certain level, and close off the broken string to reduce spillage.

Depending on the application, different types of MBC can be used for example a petal type, as described in U.S. Pat. No. 4,326,555 or a flip/flap type, in which a disc-shaped valve member is held parallel to the axis of the coupling during normal operation but flips to be perpendicular to that axis to close off the flow of product in the event of separation. A petal type of MBC does not form an interruption to the flow of the product during normal operation, while in the flip/flap type MBC the valve member forms an interruption to the normal flow of the product. Other forms of MBC such as a valve probe type where spring loaded valve members move axially within the coupling to close it off on separation are also known.

It is known that a MBC can be damaged in service by contact with a rigid structure for example side of a tanker, adjacent offloading string, contact with a work boat, contact with a floating buoy, or contact with the seabed in case of a submarine system. Any damage to the MBC can impact its functional integrity and cause a full or partial separation of the MBC. A partial separation may allow ingress of product from outside or inside into the internal structure of the MBC causing corrosion, or prevent function as intended. A MBC may have a flotation unit attached to it or may be designed neutrally buoyant. If the flotation unit is damaged, or neutral buoyancy affected by for example marine growth or adjacent flexible sections not offering sufficient buoyancy, the MBC can sink and pull the entire offloading string down into the sea an event known as auto-submergence. Therefore, it is necessary to inspect the MBCs on a regular basis which is typically done by a physical inspection using work boats, divers, ROV or even physical removal of the MBC followed by an onshore inspection. Such inspections interrupt an offshore operation and can be extremely expensive, and are therefore sometimes not performed. The frequency of inspection is currently not based on science and is reliant on the advice of manufactures or carried out after an accident. The same approach is also adopted in regard to determining the useful life of a MBC.

Following the completion of a loading operation, the temperature of the product in the offloading string may reduce, resulting in the contraction of the product and creation of a vacuum, which can be disastrous particularly in case of a submarine system. The vacuum can disturb the designed configuration of the system, resulting in potential overloading of the submarine offloading string and the activation of the MBC, if one is in place.

A MBC may be activated at any time and typically the cause of 50% of activations is known and for the rest the cause is unknown, and may be due to an accident, operational issue or a function of the MBC itself. In any case, the exact loads and conditions of the activation are never known making a root cause analysis extremely difficult.

SUMMARY OF THE INVENTION

The present invention provides a breakaway coupling for an offloading string, the coupling comprising two body parts each arranged for connection to a respective string section, the two body parts being separably connected together, movement sensing means arranged to sense movement of the two body parts relative to each other, and transmission means arranged to transmit a separation signal in response to sensing of the relative movement.

The system may further comprise processing means connected to the movement sensing means and to the transmission means, and arranged to receive an activation signal from the movement sensing means, and to output the separation signal for transmission by the transmission means.

The movement sensing means may comprise a switch arranged to be closed in response to the movement.

The system may further comprise a power supply, and the switch may be arranged to connect the transmission means to the power supply in response to the movement.

The movement sensing means may further comprise a magnet arranged to close the switch in response to the movement. Alternatively other activation mechanisms may be used, for example a physical link such as a wire may be arranged to close the switch in response to the movement, or the movement may be arranged to break a circuit which can trigger transmission of the separation signal.

In addition, or alternatively, the movement sensing means may comprise a wireless ranging system arranged to measure relative movement of the two coupling parts over a range of distances.

The processing means, the power supply and the movement sensing means may form at least part of a separation node which may be arranged to remain in an inactive mode while the coupling parts are in a fully coupled condition, and to be activated by separation of the coupling parts. In this case the movement sensing means may be arranged to trigger the separation signal on detection of the movement, and may also activate the separation node whereby further relative movement of the two parts of the coupling can be measured by the wireless ranging system.

The system may further comprise a monitoring node and at least one monitoring sensor. The monitoring node may comprise processing means and transmission means and may be arranged, while the coupling is in a fully coupled condition, to receive inputs from the at least one sensor and to transmit monitoring data derived from the inputs.

The wireless ranging system may comprise a first transceiver forming part of the separation node and a second transceiver forming part of the monitoring node.

The system may further comprise at least one monitoring sensor. The processing means may be arranged to receive signals from the at least one sensor, the processing means may be arranged to analyse the signals to determine when a fault condition is met. The processing means may be arranged to generate a fault indication output if the fault condition is met.

The processing means may be mounted on the coupling, for example forming part of a node which is mounted on the coupling, or it may comprise one processor on each of two or more nodes mounted on the coupling. Indeed at least a part of the processing means may be located remotely from the coupling, for example on a buoy or on land, and the raw data may be transmitted to that remote location for processing.

The system may include a receiver arranged to receive vessel tracking signals and to store data from the vessel tracking signals as a vessel movement record. The receiver may comprise the transmission means, for example forming a transceiver unit, or may comprise a separate receiver. The receiver may be on the same node as the movement sensing means, or the transmission means, or may be on a separate node. The vessel movement record may include at least one of the identity and the position of vessels together with associated times. The system may be arranged to transmit data from the vessel movement record on separation of the coupling, for example in response to the sensing of the relative movement.

The invention further provides marine breakaway coupling system comprising a coupling, processing means, and at least one monitoring sensor wherein the processing means is arranged to receive signals from the at least one monitoring sensor, to analyse the signals to determine when a fault condition is met, and to generate a fault indication output if the fault condition is met.

The at least one monitoring sensor may comprise a stress sensor arranged to measure stress in the coupling, or a plurality of stress sensors arranged to measure stress at a respective plurality of positions in the coupling.

The processing means may be arranged to store sample values of the stress and the fault condition is defined as a predetermined change in the value of the stress.

The at least one sensor may comprise a moisture sensor arranged to detect the ingress of water into the coupling.

The processing means may comprise a first processor arranged to be mounted on the coupling and a second processor arranged to be mounted in a gateway node remote from the coupling. The processing means may further comprise communication means arranged to enable the transmission of data between the first and second processors. The second processor may be arranged to receive data from the first processor at predetermined times, and to determine if the data is not successfully transmitted at a predetermined number of the predetermined times, for example two times or three times. In response, the second processor may be arranged to generate a submergence warning signal.

The present invention further provides a condition monitoring system for a marine breakaway coupling of an off-loading string, the monitoring system comprising a monitoring node arranged to be mounted on the coupling, the monitoring node being arranged to monitor the condition of the coupling and transmit condition indication signals at predetermined times, and a further node arranged to be located remote from the coupling and to receive the condition indication signals at the predetermined times, wherein the further node is further arranged to determine if the condition indication signals are not successfully transmitted at a predetermined number of the predetermined times, and in response, to generate a submergence warning signal.

The monitoring node may be arranged to transmit the condition indicating signals wirelessly to the further node.

The further node may be a gateway node arranged to communicate further condition indicating signals to a central hub.

The monitoring node may be a first monitoring node and the system may further comprise a second monitoring node arranged to be mounted on the marine breakaway coupling at a different position to the first monitoring node. The second monitoring mode may be arranged to operate in the same way as the first monitoring node. The second monitoring mode may be arranged to transmit condition indication signals to the further node if the first monitoring node is under water. The system may further comprise a third monitoring node. The monitoring nodes, of which there may be at least three, may be substantially equally spaced around the central axis of the MBC.

BRIEF DESCRIPTION OF THE DRAWINGS

FIG. 14 is a flow diagram showing operation of a submergence detection function of the system of FIG. 11.

DESCRIPTION OF EMBODIMENTS

Figure 1:
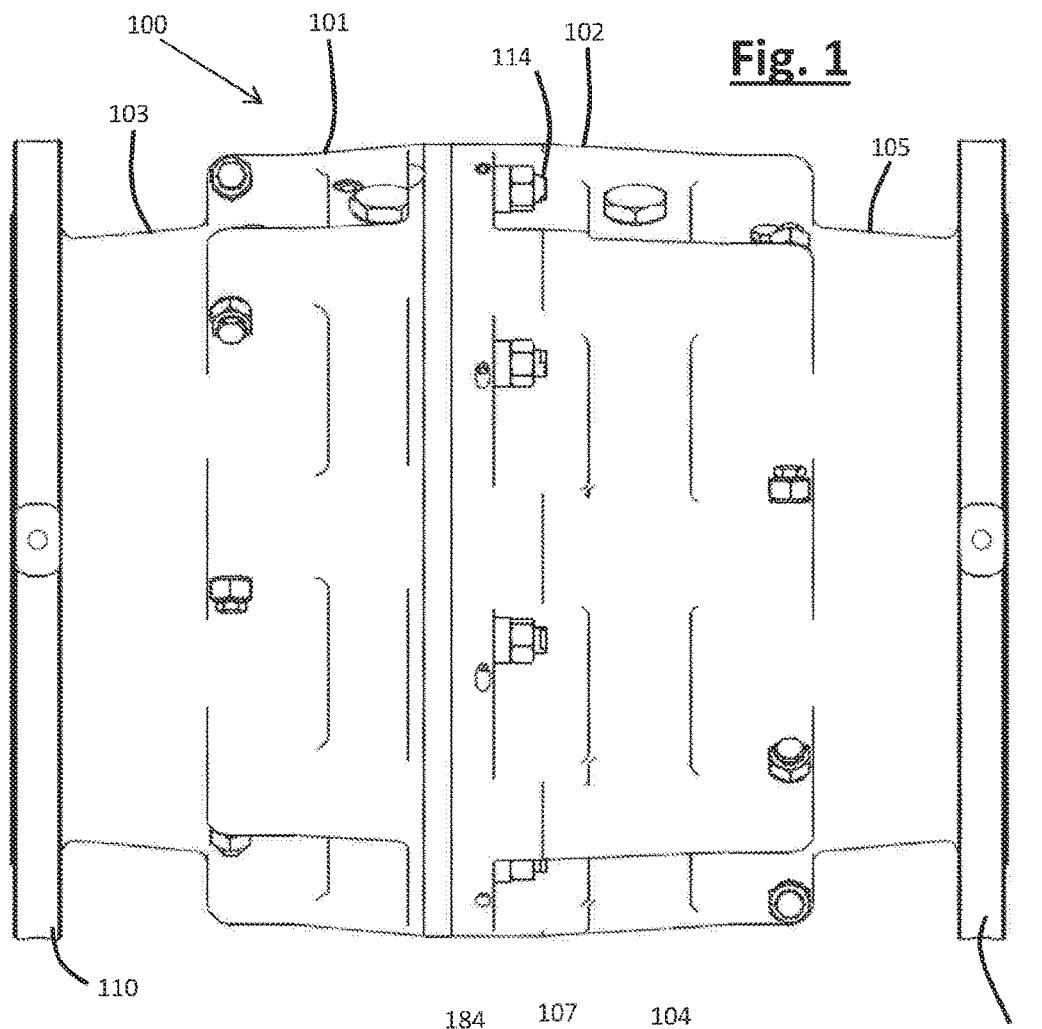
FIG. 1 is a side view of a marine breakaway coupling according to an embodiment of the invention.
Figure 2:
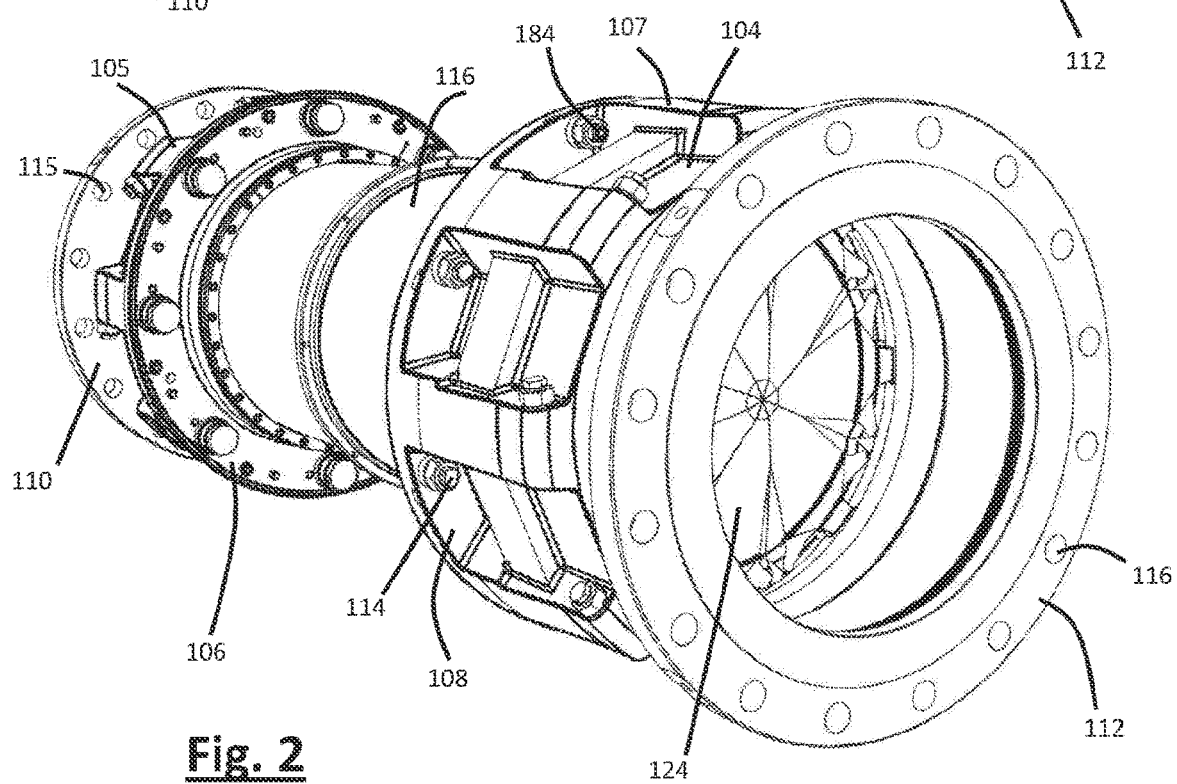
FIG. 2 is a perspective view of the MBC of FIG. 1 in a separated state.

Referring to FIGS. 1 and 2, a marine breakaway coupling 100 comprises a first part 101 and a second part 102. Each of the coupling parts 101, 102 comprises a substantially cylindrical body part 103, 104 having a coupling flange 106, 108 at one end and a connecting flange 110, 112 at the other end, and defining a conduit through which product such as oil, gas or other hydrocarbons can flow. The two coupling flanges 106, 108 are arranged to be held in contact with each other by means of a number of break-bolts 114. The break-bolts 114 are arranged to break under a predetermined—stress so as to provide the breakaway function of the coupling. Each of the connecting flanges 110, 112 is arranged for connection to a respective string section such as a flexible hose section, for example by having a series of bolt holes 115 formed through it through which bolts can extend to make the connection. The first coupling part 101 has a series of axially extending ribs 105 on the outer surface of the cylindrical body part 103, and second coupling part 102 has a series of axially extending ribs 107 on the outer surface of the cylindrical body part 104.

Figure 3:
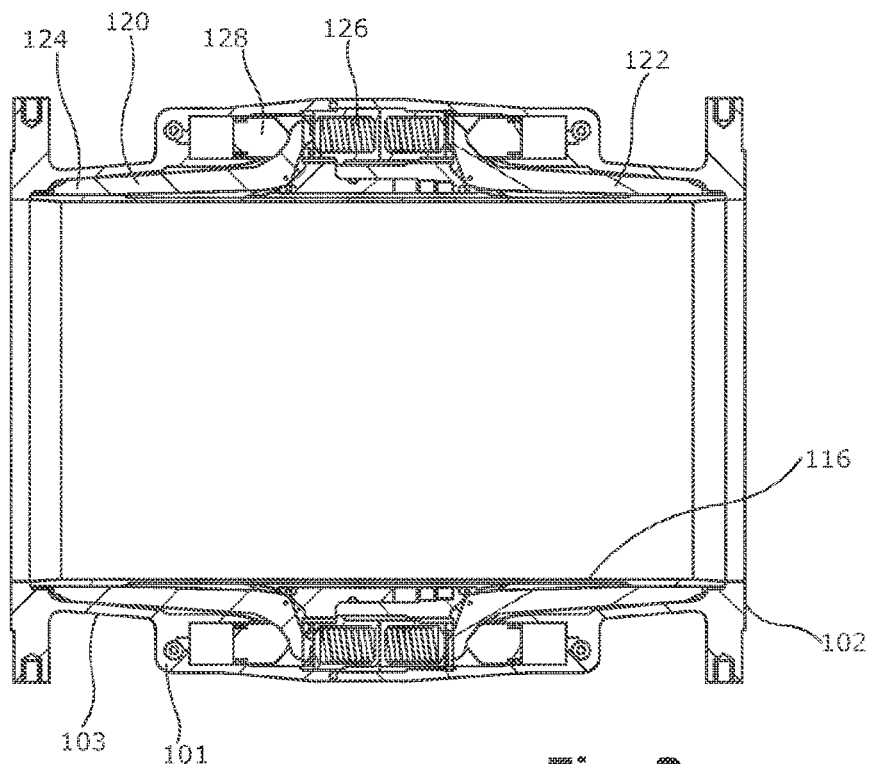
FIG. 3 is a cross section through the MBC of FIG. 1.
Figure 4:
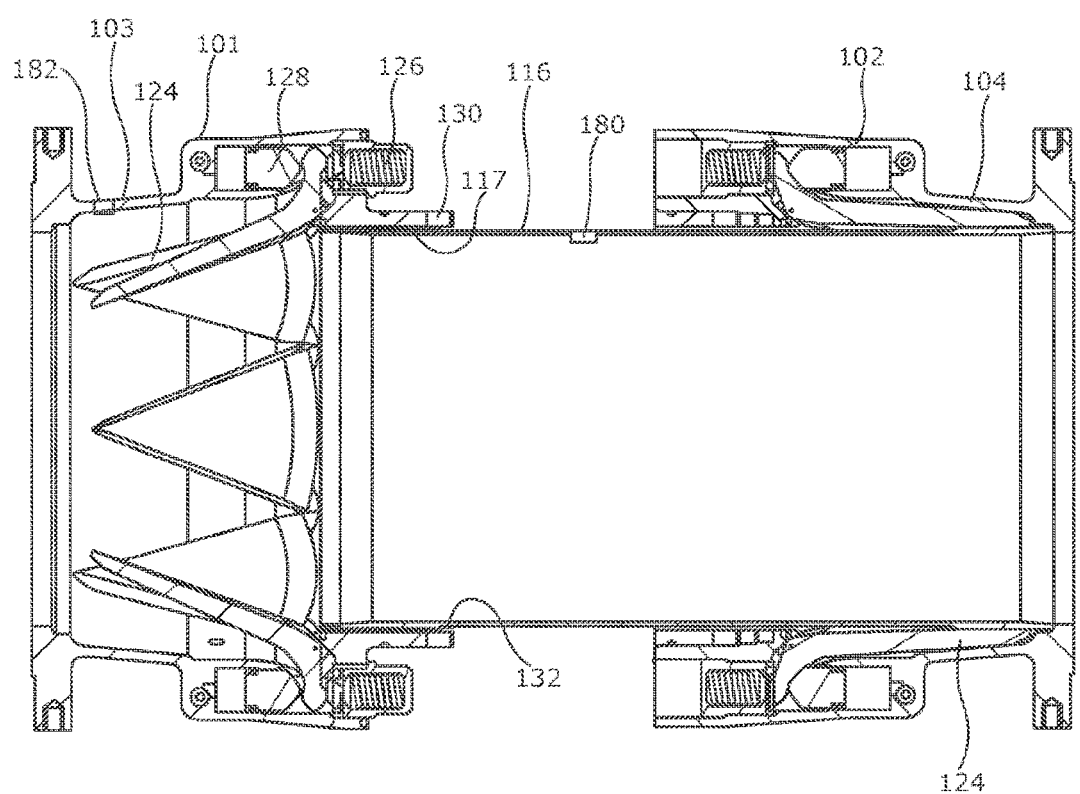
FIG. 4 is a cross section through the MBC of FIG. 1 in the partially separated state.

Referring also to FIGS. 3 and 4 a sleeve 116 extends through both of the body parts 103, 104 from the connecting flange 110 of the first body part to the connecting flange 112 of the second body part. This sleeve 116 forms a lining for the conduit through which the product flows when the coupling is in its coupled condition with the two coupling parts 101, 102 securely fastened to each other.

Referring to FIGS. 3 and 4, if the MBC is of the petal valve type, each of the coupling parts 101, 102 comprises a petal valve 120, 122 which is arranged to close the conduit on separation of the two body parts 101, 102 from each other. Each of these petal valves 120, 122 comprises a set of petals 124 pivotably mounted in the respective body part 103, 104 and moveable between an open position, as shown in FIG. 3, in which they allow the flow of fluid through the conduit, and a closed position, as shown in FIG. 2, in which they close and seal the conduit. The closure of each of the petals 124 is controlled by a spring 126 which urges the petal towards its closed position, and a hydraulic damper 128 which controls the rate of movement of the petal towards its closed position. These can be set so as to control and coordinate the timing of closure of the petals 124.

Figure 5:
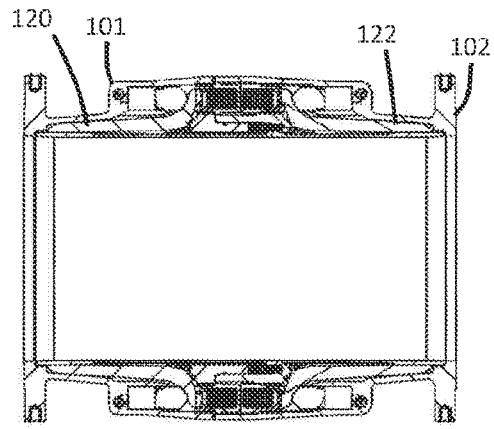
FIGS. 5 to 8 show the MBC of FIG. 1 at different degrees of separation.
Figure 6:
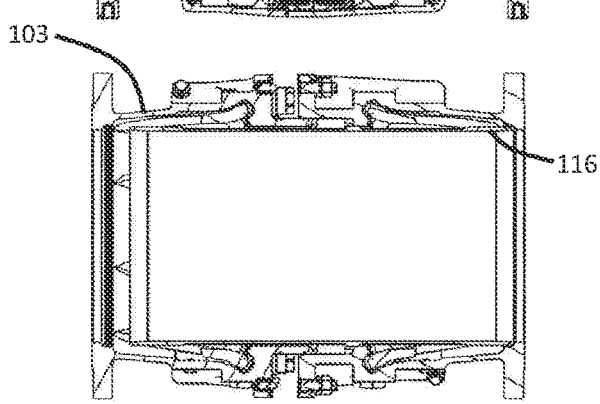
Figure 7:
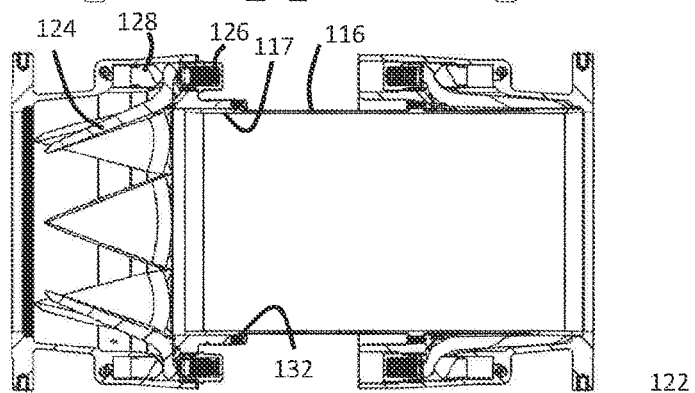
Figure 8:
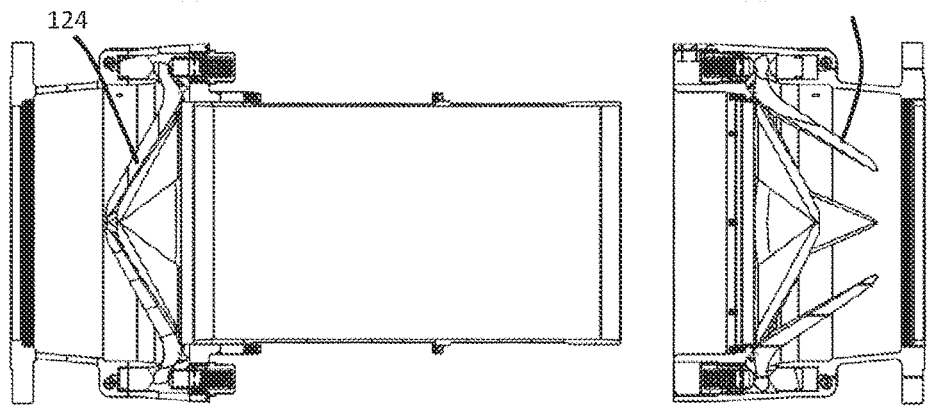

The sleeve 116 holds the petals 124 of both petal valves 120, 122 in their open position when the coupling is in its coupled condition as shown in FIG. 5. If the break-bolts 114 are broken and the two coupling sections start to move apart as shown in FIG. 6, the sleeve 116 slides out of one of the body sections 103, whilst remaining sealed to it by ring seal 130, until the sleeve 116 is clear of the petals 124 which then rotate under the control of the springs 126 and dampers 128 until they close and seal the conduit through the first coupling section 101. Then at the position shown in FIG. 7 further movement of the sleeve 116 out of the first coupling section 101 is stopped by a thickened end section 117 of the sleeve 116 coming into contact with an inward facing ridge 132 on the inside of the body part 103 of the first coupling section 101. Then, on further movement of the two coupling parts 101, 102 away from each other, the sleeve 116 slides out of the second coupling part 102, allowing the second petal valve 122 to close and seal off the conduit through the second coupling part 102. Then on still further movement the sleeve 116 is pulled completely clear of the second coupling part 102 as shown in FIG. 8 and the separation is then complete.

Figure 9:
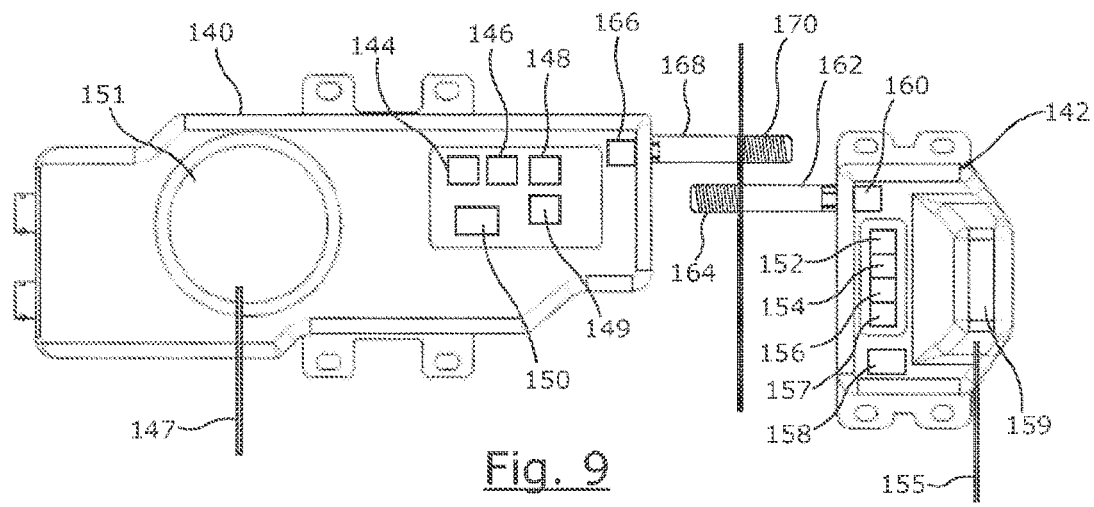
FIG. 9 is a plan view of two node units of the coupling of FIG. 1.

Referring to FIG. 9, a monitoring system for the MBC comprises a main monitoring node 140 and a separation monitoring node 142. The main node and the separation node can each be mounted on either of the coupling parts 101, 102, but one may be mounted on one of the coupling parts and the other mounted on the other so that relative movement of the two coupling parts produces relative movement of the two nodes 140, 142. This may be used for detection of decoupling of the MBC. The nodes 140, 142 can be bolted to the body of the coupling parts 101, 102 as shown in FIG. 9, but alternatively may be attached to the coupling parts 101, 102 by means of straps or a jacket, or integrated into a floatation unit which is attached to the coupling.

The main monitoring node 140 comprises a processor 144, a number of sensors 146, a modem 148 and an aerial 147 for wireless radio communication with a further node, for example a gateway node located on a buoy, for onward transmission and analysis, a short-range transceiver 149 for communication with the separation node 142, and a power supply 150 typically in the form of a battery. The battery may be rechargeable, for example using solar power from a solar panel mounted at an appropriate position on the string. Also the power supply maybe external to the node and connected to it, to supply power to it. Part of the aerial 147, and any further aerials for example for the short-range communication and a GPS unit which may also be provided in one of both of the nodes 140, 142, are housed within a protective dome 151. The short-range communication between the nodes may be ultra-wideband (UWB) communication which also allows the nodes to measure and monitor the distance between the two nodes, or any other suitable type of communication. At least some of the sensors 146 may be located at various positions on the coupling and connected to the node 140. The sensors 146 are arranged to sense various operational and health or condition parameters of the coupling 100, in particular of the product flowing through it. They can include one or more of: a temperature sensor arranged to sense the temperature of the product flowing through the coupling, a pressure sensor arranged to measure the pressure of the product flowing through the coupling, one or more load sensors arranged to measure the loads at one or more positions on the coupling, and sensors to detect the presence of any product within the internal structure of the MBC. The sensors for monitoring the product will typically be at least to some extent remote from the node 140 and electrically connected to it. However, they may be integrated into the node 140 and connected to the main product conduit through the coupling by means of a sensing conduit or channel so that they can monitor product in that main product conduit indirectly by monitoring product in the sensing conduit or channel.

The separation monitoring node 142 comprises a processor 152, a number of sensors 154 arranged to sense various operational parameters of the coupling 100, a modem 156 and aerial 155 for wireless communication with a further node, for example a gateway node located on fixed point for example a buoy, FPSO, FSO, Tower or land, for onward transmission and analysis, a short range transceiver 157 for communication with the main monitoring node 140, and a power supply 158 in the form of a battery. Part of the aerial 155, and any further aerials for example for the short-range communication and GPS, are housed within a protective dome 159. The sensors 154 forming part of, or connected to, the separation node 142 may correspond to those 146 of the main node 140, but may include further sensors specifically relevant to the separation monitoring.

In some cases it may be possible for the main monitoring node 140 and the separation monitoring node 142 to share one or more of their sensors 146, 154, so as to reduce the number of components of the system. For example if both of the nodes 140, 142 are mounted on the same coupling part 101 or 102, then this will be simple. However, if they are each on a different one of the coupling parts, if one or more of those sensors is wirelessly connected to one of the nodes, it can be wirelessly connected to both of them. Also if more than one main monitoring node 140 is provided on one of the coupling parts 101, 102, then they can share one or more common sensors, and similarly if more than one separation monitoring node 142 is provided on one of the coupling parts 101, 102, then they can share one or more common sensors.

The separation node 142 further comprises a movement sensor 160 arranged to detect relative movement of the two coupling sections 101, 102 away from each other. This movement sensor 160 comprises a reed switch which is arranged to be held open by a magnet 162 when the coupling is fully coupled state, but to close on partial separation of the coupling. The reed switch 160 may be arranged to connect the power supply 158 to the processor 152 so that closure of the reed switch 160 closes the connection between the power supply 158 and the processor, which can activate the processor 152 to activate the separation node 142. For example, the magnet 162 may comprise a magnetic rod and may be mounted in the flange of the coupling part 101, i.e. the part of the coupling that the separation node is not mounted on, by means of a threaded part 164 on the rod 162, and extend through a hole in the flange of the other coupling part 102.

Similarly the main monitoring node 140 may comprise a movement sensor in the form of a reed switch 166, which is mounted close to a magnetic rod 168 mounted in the flange of the second coupling part 102 by means of a threaded part 170, and extends through a hole in the flange of the other coupling part 101. The reed switch 166 in the main node 140 is arranged to provide an input to the processor 144, for example from the battery 150, so that the processor 144 can detect partial separation of the two coupling parts 101. 102. That input from the battery 150 is in addition to the main power connection between the battery 150 and the processor 144.

Figure 10:
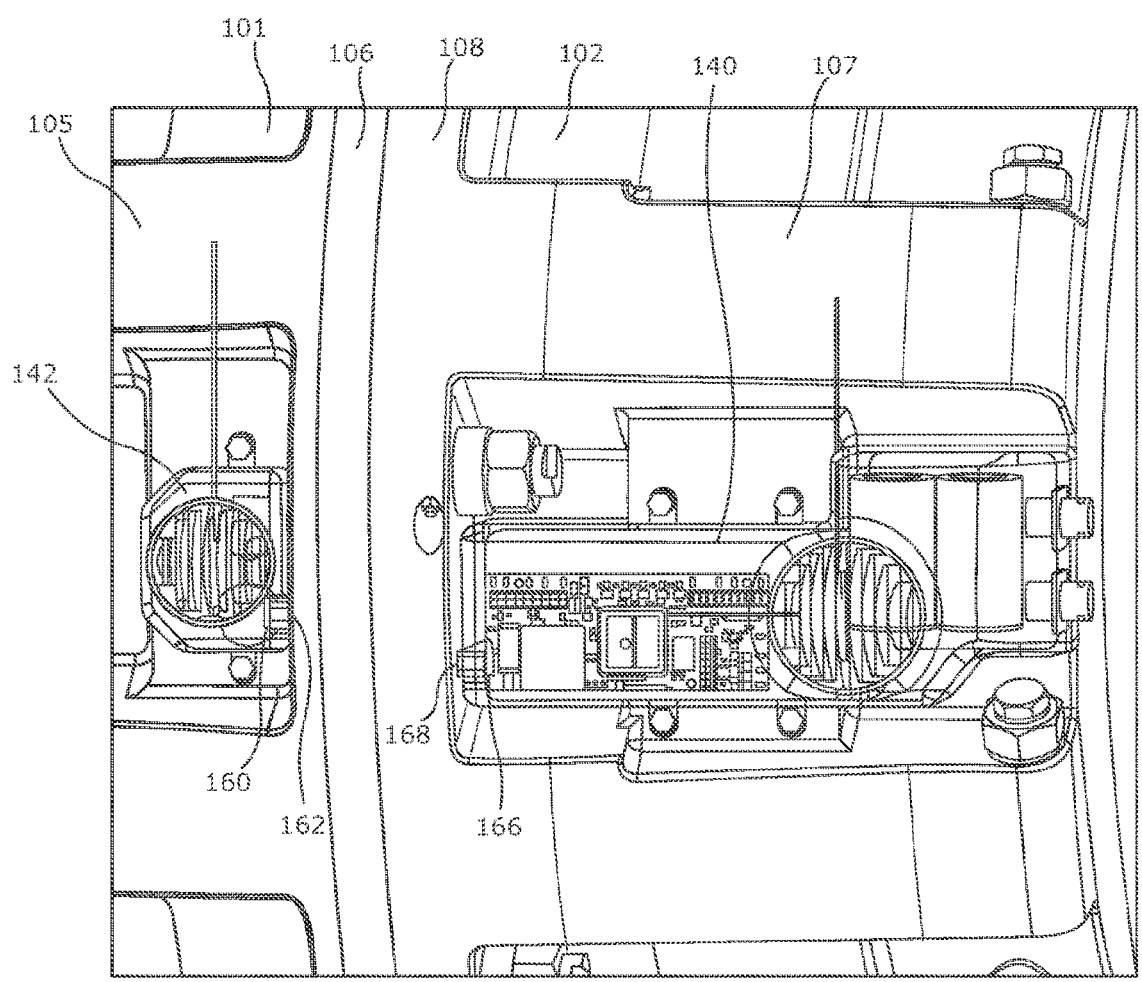
FIG. 10 shows the location of one of the node units of FIG. 6 in the MBC of FIG. 1.

FIG. 9 shows the positions of the reed switches 160, 166 and the magnetic rods 162, 168 when they are all mounted in place in the coupling parts 101, 102. As can be seen in FIG. 10, if the main node 140 is mounted on the second coupling part 102 then it is positioned such that the reed switch 166 is located close to the coupling flange 108 of the second coupling part 102. The magnetic rod 168 which controls operation of that reed switch 166 is mounted in the coupling flange 106 of the first coupling part 101, but extends through an aperture in the coupling flange 108 of the second coupling part 102 so that its end is close to the reed switch 166. Similarly, if the separation node 142 is mounted on the first coupling part 101 then it is positioned such that the reed switch 160 is located close to the coupling flange 106 of the first coupling part 101. The magnetic rod 162 which controls operation of that reed switch 160 is mounted in the coupling flange 108 of the second coupling part 102, but extends through an aperture in the coupling flange 106 of the first coupling part 101 so that its end is close to the reed switch 160.

The movement sensors may comprise other switches or sensors rather than the reed switch and magnet combination. For example, they may comprise pressure or contact switches mounted in the connecting flanges 106, 108 that can sense slight separation of those flanges, or an electrical connection between the two coupling parts 101, 102 that is arranged to break on partial separation of the coupling.

The two nodes 140, 142 are located on the respective coupling parts 102, 101 so that, when the coupling is in its fully coupled state, the reed switches 162, 168 are both held open by the magnetic field from the magnetic rods 164, 166. Suitable mounting positions are shown for example in FIG. 10. It should be noted that the shape of the nodes shown in FIG. 10 differ from those in FIG. 9, but it will be appreciated that the nodes 140, 142 of FIG. 9 may be installed in the same positions as those in FIG. 10.

The positioning of the nodes 140, 142 on the coupling parts 102, 101 is chosen so as to protect the nodes 140, 142 from physical damage. In particular the main monitoring node 140 is located in a recess between two of the ribs 107 on the second coupling part 102, and the separation monitoring node 142 is located in a recess between two of the ribs 105 on the first coupling part 101. The Antennas in the separation and main nodes are raised to be able to freely communicate with the gateway node, and to this extent are protected inside impact proof flexible domes 151, 159. The flexibility and impact resistance of these domes 151, 159 can be controlled in different ways for example by creating a sandwich of foams, coverage by one or more layers of Aramids and finally a layer of Ozone/UV resistant rubber or Polyurethane. Such a structure can be resilient so that it recovers its original shape after being subjected to a force. In the marine environment, marine growth is expected, and this may impact the communication between the nodes and between the nodes and the gateway. Therefore, the final layer over the domes 151, 159, and indeed over the whole of the nodes 140, 142, can be of an Anti-Marine Growth type.

Figure 11:
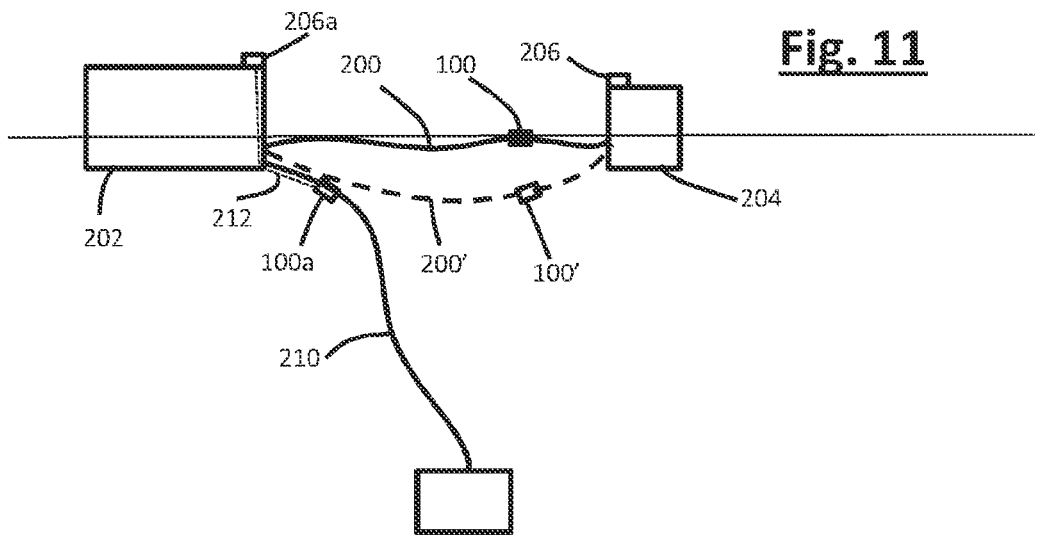
FIG. 11 is a schematic view of an oil transport system including the MBC of FIG. 1.

Referring to FIG. 11, the coupling 100 may be located in a floating offloading string 200 which is connected, for example, between an FPSO 202 and a CALM buoy 204. A gateway node 206, as described above, is located on the buoy 204. When located in a floating offloading string 200 the coupling 100 is typically partially submerged in the water. However, it is important that the main node 140 and the separation node 142 are out of the water so that they can communicate with the gateway node 206. One solution to this problem is to place a number of nodes around the circumference of the coupling 100 so that, regardless of the orientation of the coupling in the water, at least one associated pair of main node 140 and separation node 142 will be out of the water. For example, referring back to FIG. 2, if each part of the coupling has eight longitudinal ribs 105, 107, then four pairs of nodes 140, 142 can be spaced equidistantly around the central axis of the coupling. For other coupling designs, three pairs of nodes may be spaced around the coupling.

During normal operation, the main node 140 is active and its processor 144 is arranged to sample the signals from the sensors 146 at regular intervals to obtain data relating to the sensed parameters, such as oil temperature and pressure, loads in the coupling, and the position of the coupling determined using a GPS unit, and to transmit that data via the modem 148 to the gateway node. This is repeated at regular intervals in regular communication cycles, for example once every ten or fifteen 25 minutes, or at a rate as agreed with the operation team.

The separation monitoring node 142 is normally inactive, with the reed switch 162 being held open by the magnet 164, so that the power supply 158 is disconnected from the processor 152. This ensures that no power is drawn from the battery 158 and hence can function and capture the instant of a separation. However if the two parts 101, 102 of the coupling start to separate, for example by more than about 1 mm, or 5 mm or 10 mm, then the reed switch 162 closes connecting the processor 152 to the power supply 158 to activate the separation monitoring node 140. Once activated, the separation node is arranged to start transmitting data via the radio link direct to the gateway node 206. This data includes an alert that partial or complete separation of the coupling 100 has occurred, and data obtained from the sensors 154 relating to the condition of the coupling and the oil or gas flowing through it. This data can be transmitted at regular intervals, and at much higher frequency than during normal operation of the main node 140 because the requirement for preservation of battery charge which is important for the main node 140 does not apply to the separation node 142. Specifically the data may include fluid temperature data indicating the temperature of the fluid in the coupling, fluid pressure data indicating the pressure of the fluid in the coupling, coupling load data indicating loads at specific points in the coupling. Once activated, the separation node 142 may also start communicating with the main node 140 via the short range UWB transceivers. These can measure the distance between the two nodes 140, 142, providing a wireless ranging function, and therefore can provide relative position data indicating the relative position of the two coupling parts 101, 102. This provides an indication of the degree of separation of the two coupling parts. This relative position data can be communicated by the separation node 142 with other data to the gateway node 206.

The separation node 142 may provide all of the data relating to the separation of the coupling for transmission and transmit it to the gateway node 206. However, as the main node 140 also has a separation sensor in the form of a reed switch, the main node 140 can also be configured to detect partial separation of the coupling and to enter a separation mode in which it performs functions in addition to, or different from, those that it performs normally. For example, in the separation mode, the main node 140 may be arranged to communicate with the separation node via the short-range transceivers 149, 157 so that the separation node 142 can measure the distance between the two nodes as they move apart during a separation event.

A further function of the main monitoring node 140 is to monitor the condition of the MBC 100 over its lifetime and to detect any deterioration in its condition which indicates that it needs to be serviced or replaced. In order to do this a number of further sensors are provided on the MBC which are arranged to measure various parameters of the MBC, and they are connected to the processor 144 of the main monitoring node. For example, referring back to FIG. 4, these further sensors may include a stress sensor 180 arranged to measure the stress in the sleeve 116, and a moisture sensor 182 arranged to detect moisture in the space between the sleeve 116 and the coupling body 103, 104. Referring to FIG. 2, a stress sensor 184 may be provided in each of the break bolts 114.

Stress sensors typically measure the strain in the component they are mounted on which provides a measure of the level of stress in that component. Each component can typically withstand up to a limiting amount of stress (or strain) at any point without suffering undue damage, but stresses above that limiting amount tend to cause permanent damage to the component. Therefore, the processor 144 is arranged to sample the signal from each of the stress sensors at a regular sample rate so that the system can monitor the stress over time. The processing may be done locally at the monitoring node 140, or the sensor data may be transmitted via the radio link for analysis elsewhere, for example at the central hub. If the analysis is done locally, the processor 144 may be arranged, for each stress sensor 180, 184 to store the sampled values of the stress and to monitor variations in the measured stress over time, which may include determining a mean value and a measure of the variation, such as a standard deviation. Then if at any time the stress varies by more than a limiting amount from the mean, such as three times or four times the standard deviation, then the processor is arranged to determine that a fault condition has occurred and to generate a warning signal indicating that the coupling is in need of servicing or checking. Similarly, if the moisture sensor 182 detects moisture between the sleeve 116 and the coupling body 103, 104, then the processor 144 is also arranged to determine that a fault condition has occurred and to generate a warning signal. If the analysis is done remotely, then analysis can be the same, but rather than the warning signal being transmitted via the radio communication link, the sensor data is transmitted at regular intervals, and the analyse carried out, and the warning signal generated, remotely from the coupling, for example at a gateway node or at a monitoring station on land.

It will be appreciated that the stress may be measured at a number of different locations in the coupling, and the stress at any one of those locations may be sufficient to meet the fault condition and trigger the warning signal, or the fault condition may be defined as met only if at least two, or at least three of the stress sensors indicates stress above a limiting value. This provides a degree of redundancy in the monitoring system, but also ensures that isolated incidents which only affect a small part of the coupling and do not affect its overall effectiveness, do not trigger a warning signal.

Similarly, two or more moisture sensors may be provided at different positions in the coupling and the fault condition be defined as met only of both or all of them detect moisture.

Figure 12:
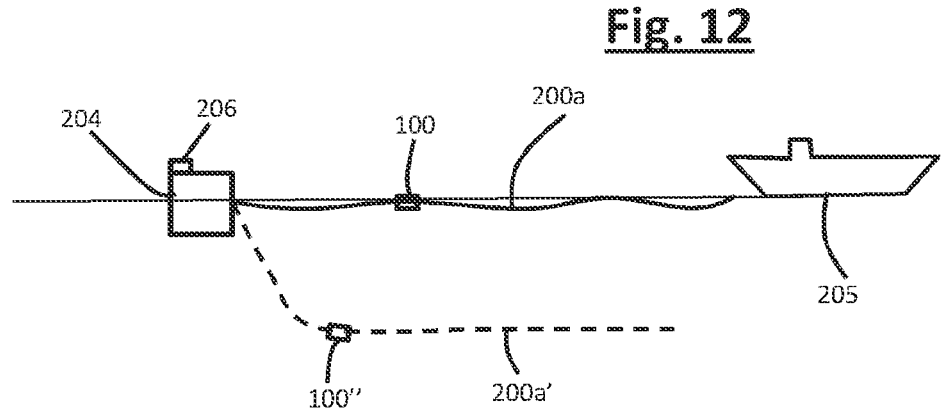
FIG. 12 is a schematic view of a further oil transport system including the MBC of FIG. 1

Referring back to FIG. 11, the system may also be arranged to detect auto-submergence of part or all of the offloading string 200. For example, where the offloading string 200 extends between a FPSO 202 and a CALM buoy 204, part or all of the offloading string 200 may submerge for example due to failure of the buoyancy of the floating string 200, excessive marine growth weighing the string down, or unusually dense fluid being pumped through the string. In that case the string 200 will sink to form a sack 200' whilst its ends remain connected to the FPSO 202 and the buoy 204. Referring to FIG. 12, if the offloading string 200*a* is for connecting the CALM buoy 204 to a tanker 205, then when the tanker 205 is disconnected from the string 200*a*, then the string 200*a* may auto-submerge to a submerged position 200*a*' with the MBC 100 sinking to the position 100". In some circumstances the offloading string 200*a* may also become detached from the CALM buoy 204 in which case the entire length of the string may become completely submerged and sink.

Figure 13:
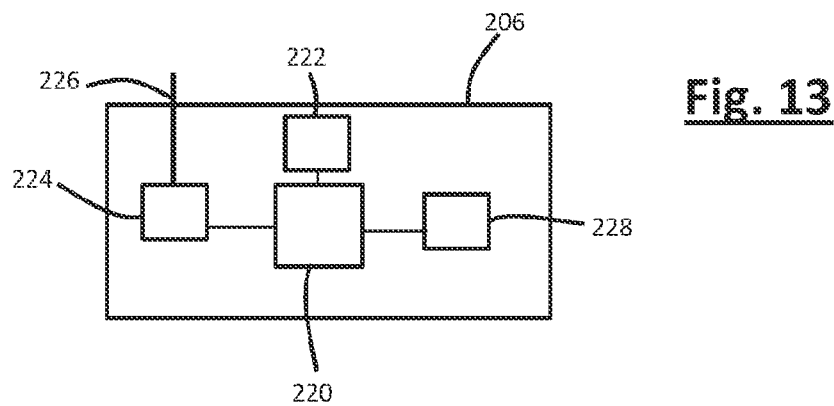
FIG. 13 is a schematic diagram of a gateway node forming part of the system of FIG. 11.

Referring to FIG. 13, the gateway node 206 also comprises a processor 220 connected to its own power supply 222, a radio transceiver 224 and radio aerial 226 for communication with the main monitoring node 140 and the separation node 142, and a further radio transmitter 228 for onward communication of the signals and data from the nodes on the coupling 100 to a central hub via satellite or other suitable means. The processor 220 is arranged to coordinate communication with the main monitoring node 140 in each of the communication cycles, and also communication with the separation node 142 if the gateway node receives a separation signal from the separation node indicating that it has been activated. During communication with the main monitoring node 140, either the gateway node 206 or the monitoring node 140 will initiate the communication cycle, the two nodes will establish a link, and the monitoring node 140 will communicate data and/or any warning or status indication signals to the gateway node. The processor 220 in the gateway node 206 includes an internal clock and the processor can therefore determine if communication with the monitoring node 140 is not established at the expected time of one or more of the communication cycles. This can be used to detect submersion of the MBC.

The radio transceiver 224 of the gateway node 206, or a separate dedicated receiver on the gateway node 206, may be further arranged to receive vessel tracking signals transmitted from vessels in the vicinity. It is well known for vessels to communicate vessel tracking data, such as their identity and position, using an automatic identification system (AIS) signal. The gateway node 206 can therefore be arranged to receive and record the vessel tracking data so as to form a vessel movement record, which may include for example vessel identities and locations with associated times, for any vessels that come within a predetermined distance of the gateway node. Then on receipt by the gateway node 206 of a separation signal from the separation node 142, the processor 220 on the gateway node is arranged to transmit data from the vessel movement record to the central hub together with the other data being transmitted. This enables the identification of any vessel which may have caused the separation of the coupling. In an alternative arrangement, the separation node 142 or the monitoring node 140 can be arranged to receive and store the vessel tracking data, either using a dedicated receiver or the transceiver described above, and to communicate them to the gateway node 206 together with other data, on detection of a separation of the coupling.

As with the sensor data from the monitoring node 140, the vessel tracking data may be transmitted continually from the receiver at which it is received onwards for analysis and/or storage. For example, if it is received at the monitoring node 140 it may be transmitted on via the gateway node 206 to the central hub together with the other sensor data, regardless of whether any separation of the coupling is detected. If it is received at the gateway node 206 then it may again be transmitted onwards to the central hub for storage and analysis either together with the regular transmissions of other sensor data when that is received from the monitoring node 140, or in separate regular communications. The analysis of which vessels might have caused any separation of the coupling can then be performed at the central hub, on receipt of a separation signal. For example, the system may be arranged to identify, from the tracking data, any vessels that were within a predetermined area associated with the coupling, such as within a predetermined distance of the coupling, within a predetermined time from the separation of the coupling. For example, any vessels that were within one, or two, nautical miles, or one or two hundred meters, from the coupling, within one hour, or two hours, before or after the detection of separation of the coupling. Alternatively, this analysis may be performed at the gateway hub 206 or even at the monitoring node 140.

Referring to FIG. 14, in one embodiment the monitoring node 142 and the gateway node 206 are arranged to communicate in a series of communication cycles using a number of steps. At step 300 the monitoring node determines using its internal clock that the requisite time has elapsed since the start of the last communication cycle and that therefore it is time to start the next communication cycle. Then at step 302 it exchanges handshake signals with the gateway node 206, for example by transmitting a handshake signal and receiving one in response. On successful exchange of handshake signals, at step 304 it transmits the data, for example an alert signal, or raw signal data, to the gateway node 206. Then it returns to step 300 to wait for the start of the next communication cycle. The gateway node at step 300a determines using its internal clock that the requisite time has elapsed since the start of the last communication cycle and that therefore it is time to start the next communication cycle. Then at step 302a it exchanges handshake signals with monitoring node 142, for example by receiving a handshake signal from the monitoring node 142 and sending one in response. If the handshake signal exchange is successful, it proceeds to step 304a where it receives the data from the monitoring node 142, and then to step 306a where it re-transmits that data on to the central hub for review or analysis. However, if at step 302a the gateway node determines that the handshake was not successful it logs a failed communication cycle at step 308a, for example by increasing a counter of failed cycles by one. Then at step 310a it checks whether a predetermined number of consecutive communication cycles, such as three, or two, have failed. If not, it returns to step 300a to await the start of the next communication cycle. However, if they have, then at step 312a it determines that a possible auto-submergence of the offloading string has occurred, and transmits a warning signal to the central hub which can alert an operator of the system that the offloading string may have submerged and be in need of attention.

It will be appreciated that the monitoring for auto-submergence may vary in other embodiments. For example, there may be no initial establishment of communication via handshake signals and the gateway node may simply wait to receive data at fixed time intervals, and in the event of it not receiving data at the expected time it may log a failed communication.

Referring back to FIG. 11, the coupling 100a may be connected into an underwater hose 210. In that case, the radio communication with the gateway node 206 will not be possible and instead an umbilical 212 is provided connecting the nodes to the gateway node 206a, which in this case is shown as located on the FPSO 202.

The invention claimed is:

1. A breakaway coupling system for an offloading string, the system comprising a first coupling part, a second coupling part and at least one monitoring sensor, the first and second coupling parts having a fully coupled condition in which they are connected together to form a conduit through which fluid can flow and movable from the fully coupled condition, through a partially coupled condition to a separated condition in which they seal the conduit, the system further comprising: a monitoring node and a separation mode, wherein:
   the monitoring node comprises a processor, a first power supply, and a transmitter and is arranged, while the coupling is in the fully coupled condition, to receive inputs from the at least one monitoring sensor and to transmit monitoring data derived from the inputs; and
   the separation mode comprises a second power supply, a movement sensor arranged to sense movement of the two coupling parts relative to each other and a transmitter arranged to transmit a separation signal in response to sensing of the relative movement, and
   the separation node is arranged to remain in an inactive mode while the coupling parts are in the fully coupled condition, and to be activated by separation of the coupling parts.

2. A system according to claim 1 wherein the separation node further comprises a processor connected to the movement sensor and the transmitter, and arranged to receive an activation signal from the movement sensor, and to output the separation signal for transmission by the transmitter.

3. A system according to claim 1 wherein the movement sensor comprises a switch arranged to be closed in response to the movement.

4. A system according to claim 3 wherein the switch is arranged to connect the transmitter to the second power supply in response to the movement.

5. A system according to claim 3 wherein the movement sensor further comprises a magnet arranged to close the switch in response to the movement.

6. A system according to claim 1 wherein the movement sensor comprises a wireless ranging system arranged to measure relative movement of the two coupling parts over a range of distances.

7. A system according to claim 1 wherein the movement sensor comprises a wireless ranging system arranged to measure relative movement of the two coupling parts over a range of distances, and the wireless ranging system comprises a first transceiver forming part of the separation node and a second transceiver forming part of the monitoring node.

8. A system according to claim 1 wherein the processor of the monitoring node is arranged to receive signals from the at least one monitoring sensor, to analyse the signals to determine when a fault condition is met, and to generate a fault indication output if the fault condition is met.

9. A system according to claim 8 further comprising a gateway node remote from the coupling, the gateway node comprising a further processor, the system further comprising a communication system arranged to enable the transmission of data between the processor of the monitoring node and the further processor of the gateway node, and wherein the further processor of the gateway node is arranged to receive data from the processor of the monitoring node at predetermined times, to determine if the data is not successfully transmitted at a predetermined number of the predetermined times, and in response, to generate a submergence warning signal.

10. A condition monitoring system for a marine breakaway coupling of an offloading string, the monitoring system comprising a monitoring node arranged to be mounted on the coupling, the monitoring node being arranged to monitor the condition of the coupling and transmit condition indication signals at predetermined times, and a further node arranged to be located remote from the coupling and to receive the condition indication signals at the predetermined times, wherein the further node is further arranged to determine if the condition indication signals are not successfully transmitted at a predetermined number of the predetermined times, and in response, to generate a submergence warning signal.

11. A monitoring system according to claim 9 wherein the monitoring node is arranged to transmit the condition indicating signals wirelessly to the further node.

12. A monitoring system according to claim 10 wherein the further node is a gateway node arranged to communicate further condition indicating signals to a central hub.

13. A monitoring system according to claim 10 wherein the monitoring node is a first monitoring node and the system further comprises a second monitoring node arranged to be mounted on the marine breakaway coupling at a different position to the first monitoring node so that it can transmit condition indication signals to the further node if the first monitoring node is under water.

14. A system according to claim 1 including a receiver arranged to receive vessel tracking data and to store the vessel tracking data as a vessel movement record.

15. A system according to claim 14 wherein the system is arranged to transmit data from the vessel movement record in response to sensing of said relative movement.

16. A system according to claim 14 wherein, in response to sensing of said relative movement, the system is arranged to identify vessels which were within a predetermined area associated with the coupling, within a predetermined time from the sensing of the relative movement.

17. A breakaway coupling system for an offloading string, the system comprising:
  a first coupling part and a second coupling part, the first and second coupling parts having a fully coupled condition in which they are connected together to form a conduit through which fluid can flow and movable from the fully coupled condition, though a partially coupled condition to a separated condition in which they seal the conduit, the system further comprising,
  a first node mounted on the first coupling part and comprising a first GPS unit;
  a second node mounted on the second coupling part and comprising a second GPS unit,
  a further node remote from the coupling, the further node comprising a further processor,
  a movement sensor arranged to sense movement of the two coupling parts relative to each other and
  at least one transmitter arranged to transmit separation signals to the further node in response to sensing of the relative movement, and to transmit positional signals to the further node, the positional signals indicating the position of each of the GPS units.

* * * * *